(No Model.)

J. B. FORSYTH.
ELASTIC TIRE FOR VEHICLES.

No. 603,268. Patented May 3, 1898.

Witnesses:
Arthur F. Randall.
John R. Snow.

Inventor:
James Bennett Forsyth
by his attorneys
Maynadier & Mitchell.

UNITED STATES PATENT OFFICE.

JAMES BENNETT FORSYTH, OF BOSTON, MASSACHUSETTS.

ELASTIC TIRE FOR VEHICLES.

SPECIFICATION forming part of Letters Patent No. 603,268, dated May 3, 1898.

Application filed September 7, 1897. Serial No. 650,705. (No model.)

*To all whom it may concern:*

Be it known that I, JAMES BENNETT FORSYTH, of Boston, in the county of Suffolk and State of Massachusetts, have invented an Improvement in the Manufacture of Elastic Tires for Vehicles, of which the following is a specification, reference being had to the accompanying drawings, in which—

Figure 1:
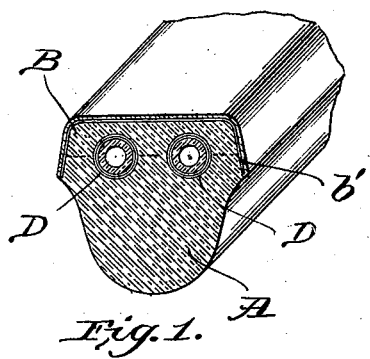
Figure 2:
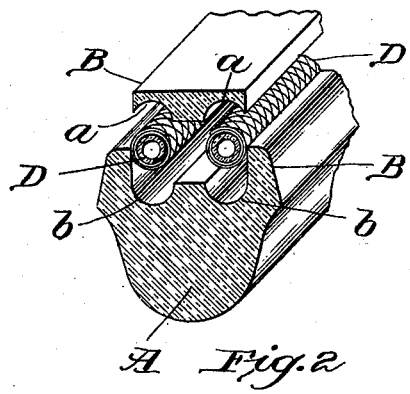
Figure 3:
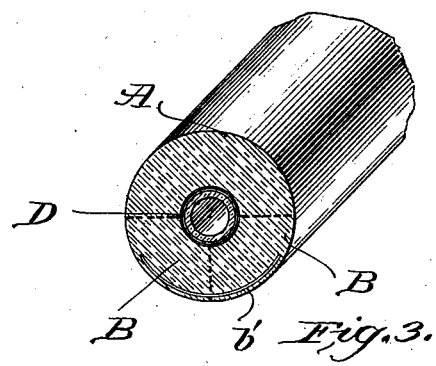
Figure 4:
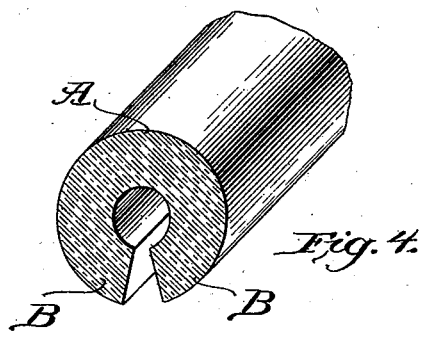
Figure 6:
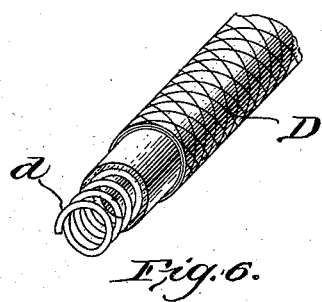
Figure 5:
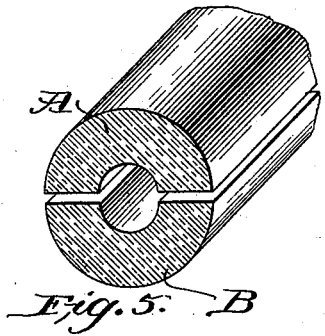

Figure 1 is a cross-section of one style of tire embodying my invention. Fig. 2 is a cross-section of the parts of which that style of tire is composed. Fig. 3 is a cross-section of another style of tire which also embodies my invention. Fig. 4 is a cross-section of the strip of rubber compound from which the tire shown in Fig. 3 is made. Fig. 5 illustrates a slightly different mode of manufacture. Fig. 6 illustrates a modification of the tube for receiving the securing-wire.

In the manufacture of vulcanized rubber tires it is essential that the tread portion of the tire shall be without plies or layers, for if a tire were built up of plies of sheet material the tread-surface would become ragged as soon as the outer ply was worn through and the plies would separate in places, which would greatly decrease the life of the tire. For these reasons rubber tires are now made by forcing the rubber compound through a die of proper size and shape to make a strip of rubber compound of the desired cross-section to fit and fill the mold in which the tire is vulcanized, this strip having a hole or holes through it lengthwise for the wire or wires by which the rubber tire is held to the metal tire on the fellies of the wheel; and in the drawings I have shown the two general styles of such tires, my improved tire being the same as those now in use with the exception that I force the rubber compound through a die or dies to make either two strips of rubber compound each with a groove or grooves on one surface or a single strip which is slit through into a lengthwise hole and insert a tube or tubes before vulcanizing, so that my improved tires consist of a tread and base of vulcanized rubber with a tube or tubes vulcanized in place between them, this latter feature being the main advantage of my invention, for it enables the securing wire or wires to hold the rubber tire in place much more securely than heretofore and does away with the chief practical objection to all other rubber tires—namely, that the rubber about the wires chafes away in use, so that the holes soon become too large for the wires, with the result that the rubber tire, although securely held in place when new, is not properly held after a short use and is less and less securely held the longer the use.

In making tires with a base and a rounding tread of the style shown in Fig. 1 I prefer to use two dies, one for the strip which forms the tread A and a part of the base B and the other for the strip which forms the rest of the base B, and form both these strips with two grooves $a$ and $b$. I then form tube D of cloth or duck coated with rubber compound or otherwise made tough and durable and cement the parts together to form the unvulcanized tire ready for the vulcanizing-mold, the after treatment being in all respects as usual. The base B is preferably reinforced by a strip $b'$ of duck coated with rubber compound, as usual.

In making tires circular in cross-section of the style shown in Fig. 3 I prefer to form first a strip which is slit into the lengthwise central hole for the securing-wire, as shown in Fig. 4, and insert the tube D, cementing it and the walls of the slit to form the unvulcanized tire with tread portion A and base B and tube D between them ready for the mold. This one-part plan is more convenient in tires of the style shown in Fig. 3; but tires of that style may be made on the two-part plan, as illustrated in Fig. 5, where the tread portion A and base B are semicircular, each with a semicircular groove for the tube D.

An additional feature of my invention is the spiral wire $d$ for the tube D, which makes the tube D much stiffer as far as concerns collapsing, and yet leaves it sufficiently flexible and resilient. Moreover, with this spiral-wire tube $d$ the securing-wire need not fit so closely and is therefore more readily inserted.

A rubber tire must be contracted in length when it is secured upon the wheel, the practice being to use a tire which is considerably longer than the circumference of the wheel (usually about one-twelfth longer or a tire thirteen feet long for a wheel twelve feet in circumference) and to crowd it back on the securing-wire, so that when the ends of the wire are fastened the resiliency of the rubber will force and hold the ends of the tire together; and, moreover, it is highly desirable that the tread portion A shall be under compression when in place on the wheel, as is obvious. For these reasons the tube D must not only be made tough and strong, but must also be so made as to be capable of being contracted in length. Loose-woven cloth or duck coated with rubber compound and cut bias, or narrow strips of coated duck or cloth wound spirally, or a braided tube coated with rubber-cement, or a tube of fibrous rubber compound I have found sufficiently tough, contractible in length, and resilient. Indeed, the wire tube $d$ may be used alone, although it is better to use a tube of coated textile material or of fibrous compound or the like with the wire tube $d$, and while my invention is embodied in a tire with a tube or tubes vulcanized in place between its tread and base portions, whether that tube be a spiral of wire or be made of rubber compound and fiber, or otherwise rendered contractile, resilient, and tough, or be a composite tube made up of both, yet in its best form the tube should be composite.

I am aware of Patent No. 575,445, to Toy and Holt, dated January 19, 1897, and disclaim all that is shown therein.

What I claim as my invention is—

1. A tire composed of a tread portion and a base portion, each of vulcanizable compound formed with tube-receiving grooves; and a contractile resilient tube (one or more) which the grooves in the tread and base portions fit, the tread portion, base portion and tube being united by vulcanization, substantially as described.

2. In a tire composed of tread and base portions with a contractile resilient tube (one or more) vulcanized in place between them, a spiral wire to strengthen the interior tube, substantially as described.

JAMES BENNETT FORSYTH.

Witnesses:
WM. MAYNADIER,
J. E. MAYNADIER.